US007726134B2

(12) United States Patent
Pasquinelli et al.

(10) Patent No.: US 7,726,134 B2
(45) Date of Patent: Jun. 1, 2010

(54) METHOD AND APPARATUS FOR PERFORMING GAS TURBINE ENGINE MAINTENANCE

(75) Inventors: Ronald Alan Pasquinelli, Minford, OH (US); Kenneth Foster Cook, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 799 days.

(21) Appl. No.: 11/184,230

(22) Filed: Jul. 19, 2005

(65) Prior Publication Data

US 2007/0084210 A1 Apr. 19, 2007

(51) Int. Cl.
*F02C 9/00* (2006.01)

(52) U.S. Cl. .................................................... 60/795

(58) Field of Classification Search .................. 60/772, 60/801, 802, 795, 785, 782
See application file for complete search history.

(56) References Cited

U.S. PATENT DOCUMENTS 1,546,579 A 7/1925 Hammond, Jr.
2,892,601 A * 6/1959 Hawkins et al. ............. 244/190
2,931,168 A 4/1960 Alexander et al
2,980,138 A 4/1961 Detweiler et al
3,566,165 A * 2/1971 Lohr ........................ 310/67 R
3,835,350 A * 9/1974 Thakore .................. 315/209 T
4,177,713 A 12/1979 Lewis et al.
4,199,007 A 4/1980 Holmes
4,235,156 A 11/1980 Olsen
4,304,263 A 12/1981 Choate
4,422,025 A * 12/1983 Steller ........................ 318/609
4,422,475 A 12/1983 Aspinwall
4,709,546 A 12/1987 Weiler
4,913,032 A 4/1990 Wernberg
5,090,194 A 2/1992 Richards et al.
6,148,235 A * 11/2000 Kuiper ........................ 607/29

* cited by examiner

*Primary Examiner*—Michael Cuff
*Assistant Examiner*—Andrew Nguyen
(74) *Attorney, Agent, or Firm*—William Scott Andes, Esq.; Armstrong Teasdale LLP

(57) ABSTRACT

A method for performing maintenance on a gas turbine engine assembly includes unplugging a first connector from a first socket, the first connector electrically coupled to the engine control unit, the first socket electrically coupled to the hydromechanical unit, plugging a second connector into the first socket, the second connector electrically coupled to a driver simulator, cranking the engine core to a low speed value, and operating the driver simulator to reposition at least one of the variable stator vane assembly and the variable bypass valve from a first operational position to a second operational position that is different than the first operational position.

15 Claims, 4 Drawing Sheets

METHOD AND APPARATUS FOR PERFORMING GAS TURBINE ENGINE MAINTENANCE

BACKGROUND OF THE INVENTION

This application relates generally to gas turbine engines and, more particularly, to a method and apparatus for performing gas turbine engine maintenance.

Gas turbine engines generally include, in serial flow arrangement, a high-pressure compressor for compressing air flowing through the engine, a combustor in which fuel is mixed with the compressed air and ignited to form a high temperature gas stream, and a high pressure turbine. The high-pressure compressor, combustor and high-pressure turbine are sometimes collectively referred to as the core engine. Such gas turbine engines also may include a low-pressure compressor, or booster, for supplying compressed air to the high pressure compressor.

At least some known gas turbine engines also include at least one variable stator vane (VSV) assembly that is utilized to control the quantity of air flowing through the high-pressure compressor to facilitate optimizing the performance of the high-pressure compressor. The variable stator vane assembly includes a plurality of variable stator vanes which extend between adjacent rotor blades. The variable stator vanes are rotatable about an axis such that the stator vanes are positionable in a plurality of orientations to direct air flow through the high-pressure compressor. Moreover, at least some known gas turbine engines include a variable bypass valve (VBV) that is configured to bypass a portion of the pressurized air generated by a booster stage, i.e. the low pressure compressor, around the high-pressure compressor to facilitate matching the output of the booster stage to the input requirements of the high-pressure compressor.

To facilitate operating the VSV's and the VBV, at least one known gas turbine engine includes a fuel system that is configured to channel fuel to an actuator that is actuated utilizing an engine control system. More specifically, as the gas turbine engine is operated, the engine control system electrically actuates the actuator such that fuel supplied by the fuel pump, is channeled to either the VSV's and/or the VBV to facilitate repositioning either the VSV's and/or the VBV.

When the gas turbine engine receives a shutdown command, the engine control system, based on at least one predetermined engine operating parameter, ceases to provide the actuator any operational commands such that the VSV's and the VBV will "drift" to a failsafe operating position.

Accordingly, to service the gas turbine engine, maintenance personnel must reposition the VSV's and/or the VBV to a desired position. For example, to borescope the gas turbine engine, the maintenance personnel will reposition the VSV's to a fully open position, and reposition the VBV to a fully closed position. To reposition either the VSV's and/or the VBV, the maintenance personnel disconnect the fuel line between the fuel pump and the engine control system, and install a hand pump to facilitate channeling fuel to either the VSV's and/or the VBV. More specifically, the handpump is operated to either open and/or close at least one the VSV's and the VBV when the gas turbine engine is not operating.

However, utilizing a handpump to reposition either the VSV's and/or the VBV increases the time and thus the cost of maintaining the gas turbine engine. Moreover, when the fuel line between the fuel pump and the engine control system is reconnected, the gas turbine engine must be operated in a test configuration to verify that the fuel system is not leaking. Accordingly, utilizing a hand pump to reposition either the VSV's and/or the VBV increases the time and thus the cost to perform maintenance on the gas turbine engine.

BRIEF DESCRIPTION OF THE INVENTION

In one aspect, a method for performing maintenance on a gas turbine engine assembly is provided. The method includes unplugging a first connector from a first socket, the first connector electrically coupled to the engine control unit, the first socket electrically coupled to the hydromechanical unit, plugging a second connector into the first socket, the second connector electrically coupled to a driver simulator, and operating the driver simulator to reposition at least one of the variable stator vane assembly and the variable bypass valve from a first operational position to a second operational position that is different than the first operational position.

In another aspect, a driver simulator for performing maintenance on a gas turbine engine assembly is provided. The gas turbine engine assembly includes a gas turbine engine including at least one variable stator vane assembly, at least one variable bypass valve, a hydromechanical unit that includes a first servo motor coupled to at least one variable stator vane assembly and a second servo motor coupled to at least one variable bypass valve. The driver simulator includes a first system coupled to the hydromechanical unit and configured to reposition the variable stator vane assembly from a first operational position to a second operational position, and a second system coupled to the hydromechanical unit and configured to reposition the variable bypass valve from a first operational position to a second operational position.

DETAILED DESCRIPTION OF THE INVENTION

Figure 1:
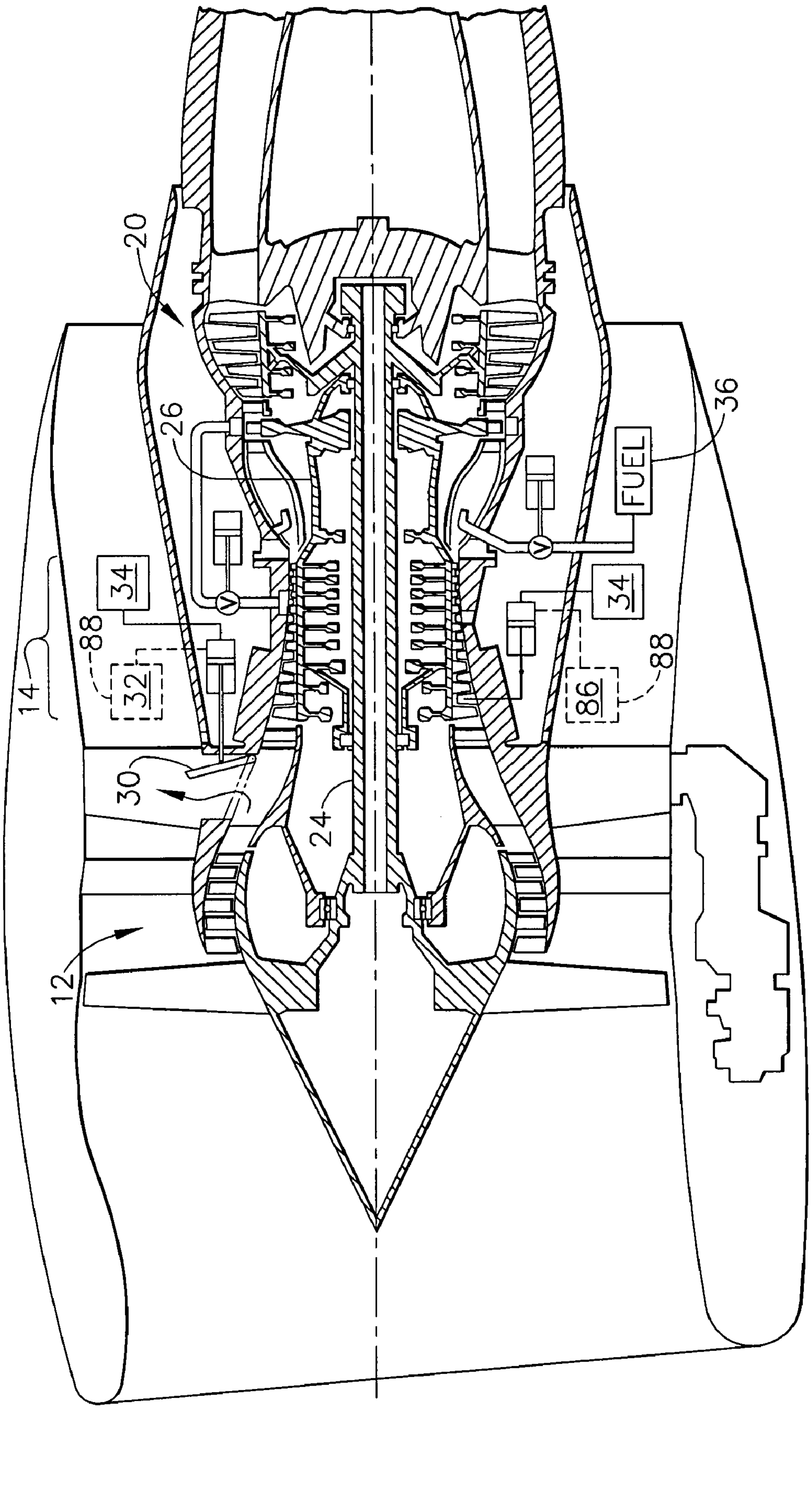
FIG. 1 is schematic illustration of an exemplary gas turbine engine.

FIG. 1 is a schematic illustration of an exemplary gas turbine engine assembly 10 that includes, in serial flow relationship, a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, engine 10 is an GE90 engine commercially available from General Electric Company, Cincinnati, Ohio.

In operation, air flows through low pressure compressor 12 from an upstream side 11 of engine 10 and compressed air is supplied from low pressure compressor 12 to high pressure compressor 14. Compressed air is then delivered to combustor assembly 16 where it is mixed with fuel and ignited. The combustion gases are channeled from combustor 16 to drive turbines 18 and 20.

Gas turbine engine 10 also includes at least one variable bypass valve (VBV) 30 that is utilized to control the quantity of air flowing from low-pressure compressor 12 to high pressure compressor 14. More specifically, VBV 30 facilitates matching the output airflow from low pressure compressor 12 to the input airflow requirements of high pressure compressor 14. More specifically, gas turbine engine 10 includes a servo motor 32 that is coupled to VBV 30 such then when servo motor 32 is actuated by an engine control unit 34 (ECU), fuel is channeled from a fuel pump 36 to servo motor 32 to facilitate repositioning VBV 30.

Figure 2:
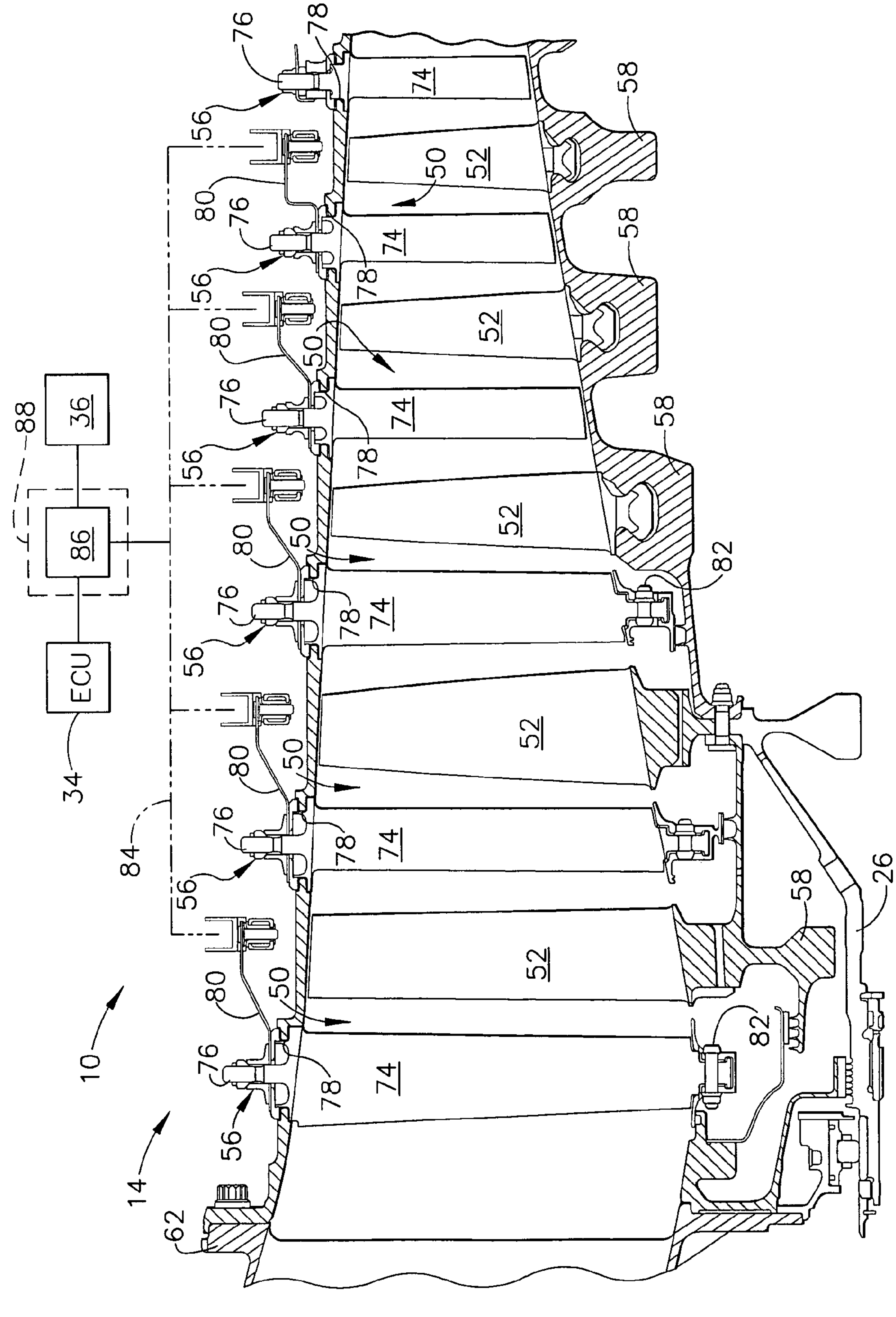
FIG. 2 is a schematic view of a section of the high pressure compressor used with the engine shown in FIG. 1.

Gas turbine engine 10 also includes at least one variable stator vane assembly 56 (shown in FIG. 2). More specifically, and in the exemplary embodiment, high pressure compressor 14 includes a plurality of stages 50, wherein each stage 50 includes a row of rotor blades 52 and a row of variable stator vane assemblies 56. Rotor blades 52 are typically supported by rotor disks 58, and are connected to rotor shaft 26. Each variable stator vane assembly 56 includes a plurality of variable vanes 74 each having a respective vane stem 76. Vane stem 76 protrudes through an opening 78 in casing 62. Each variable stator vane assembly 56 also includes a lever arm assembly 80 that extends from each variable stator vane 74. In the exemplary embodiment, lever arm assembly 80 is utilized to rotate the respective variable stator vanes 74. Vanes 74 are oriented relative to a flow path through compressor 14 to control air flow therethrough. In addition, at least some vanes 74 are attached to an inner casing 82. Each variable stator vane assembly is coupled to a lever arm 84 that is configured to move each variable stator vane assembly 56 approximately simultaneously. More specifically, gas turbine engine 10 includes a servo motor 86 that is coupled to lever arm 84 such then when servo motor 86 is actuated by ECU 34, fuel is channeled from a fuel pump 36 to servo motor 86 to facilitate repositioning variable stator vane assemblies 56. In the exemplary embodiment, servo motor 32 and servo motor 86 are coupled within a single hydromechanical unit (HMU) 88. Servo motor as used herein is defined as an electrical device, such as a motor for example, that is coupled to a valve. When the electrical device is activated the valve is moved to facilitate channeling a working fluid therethrough.

During operation, gas turbine engine 10 is operated such that fuel pump 36 is configured to channel fuel to either servo motor 32 and/or servo motor 86. More specifically, as gas turbine engine 10 is operated, ECU 34 electrically actuates servo motors 32 and 86 such that fuel supplied by fuel pump 36, is channeled to either the VSV's 56 and/or the VBV 30 to facilitate repositioning either VSV's 56 and/or VBV 30. As used herein, ECU 34 can be any control unit that is configured to transmit and/or receive signals from gas turbine engine 10 to facilitate operating gas turbine engine 10. For example, ECU 34 may be either a Full Authority Digital Engine Control (FADEC), or a Modernized Digital Engine Control (MDEC). As used herein, an ECU can be any electronic device that resides on or around gas turbine engine 10 and includes at least one of software and/or hardware that is programmed to control and/or monitor gas turbine engine 10.

Figure 3:
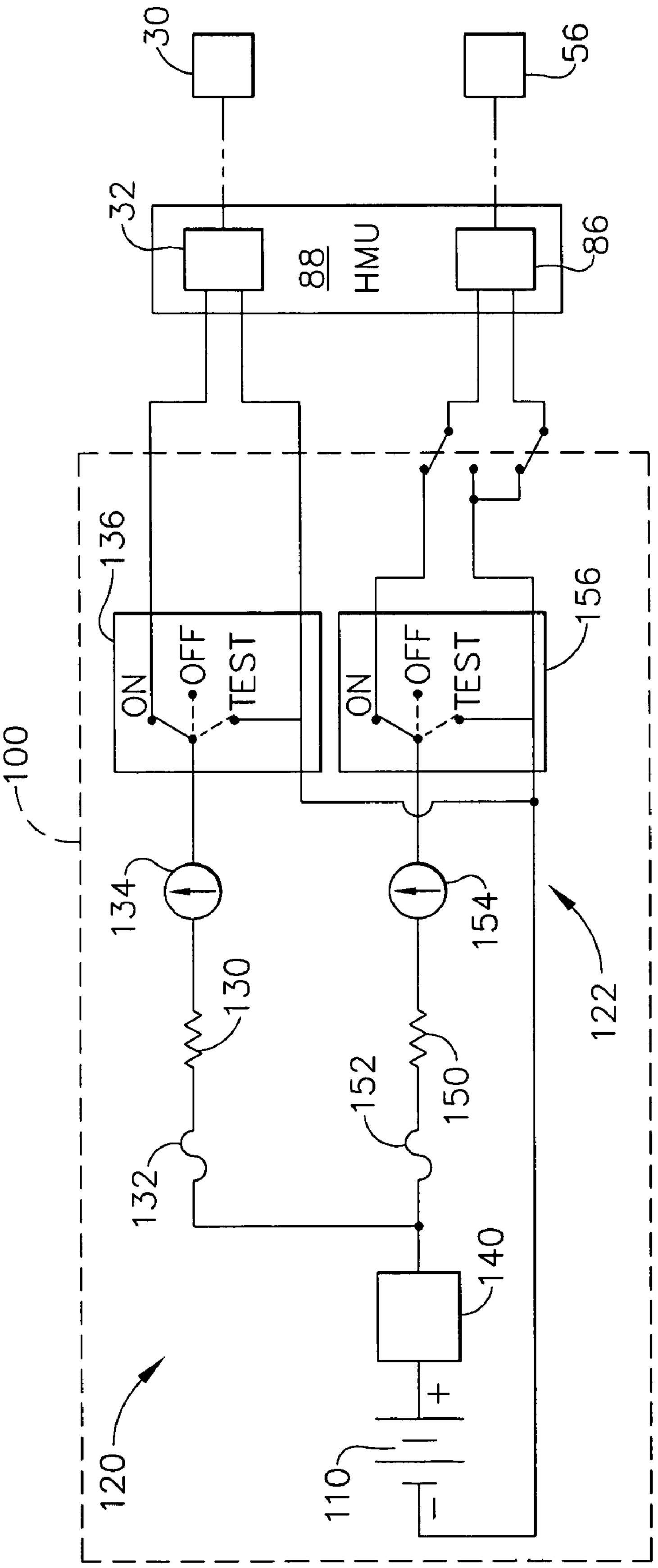
FIG. 3 is a simplified schematic illustration of an exemplary driver simulator that can be utilized with the gas turbine engine shown in FIG. 1.

FIG. 3 is a simplified schematic illustration of a driver simulator 100 that can be utilized to operate either servo motor 32 and/or servo motor 86 and thus reposition either VBV 30 and/or VSV's 56. In the exemplary embodiment, driver simulator 100 is a portable device that is configured to be removably coupled to HMU 88. In an alternative embodiment, driver simulator 100 is coupled directly to servo motor 32 and/or servo motor 86.

In the exemplary embodiment, driver simulator 100 includes a power source 110. In one embodiment, power source 110 is a DC battery. In an alternative embodiment, power source 110 includes a transformer (not shown) such that standard AC current can be utilized to operate driver simulator 100. Driver simulator 100 also includes a first system 120 that is configured to either open and/or close VBV 30, and a second system 122 that is configured to either open and/or close VSV's 56. In the exemplary embodiment, first system 120 includes at least one resistive element 130 that is utilized to resist, limit and/or regulate the flow of electrical current from power source 110 to HMU 88, and at least one current interrupter 132 that is coupled between power source 110 and resistive element 130. In the exemplary embodiment, current interrupter 132 is a fuse that is configured to interrupt the flow of electrical current from power source 110 to HMU 88 when a predetermined current threshold has been exceeded.

First system 120 also includes a meter 134 that is configured to sense the output from power source 110 and generate a visual indication to facilitate an operator determining when power source 110 is not operating within predefined limits. First system 120 also includes a multi-position switch 136 to facilitate operating first system 120 in a plurality of different operational modes. In the exemplary embodiment, switch 136 is a three position switch such that first system 120 can be operated in three distinct modes of operation. In the exemplary embodiment, driver simulator 100 also includes a reverse polarity switch 140 that is operable to facilitate connecting the power supply and the load side, i.e. power source 110 and HMU 88, when both are of contrary polarity, that is, out of phase, with respect to each other such that driver simulator 100 can be utilized on a wide variety of gas turbine engines.

Driver simulator 100 also includes second system 122. In the exemplary embodiment, second system 122 is substantially similar to first system 120 and includes at least one resistive element 150 that is utilized to resist, limit and/or regulate the flow of electrical current from power source 110 to HMU 88, and at least one current interrupter 152 that is coupled between power source 110 and resistive element 150. In the exemplary embodiment, current interrupter 152 is a fuse that is configured to interrupt the flow of electrical current from power source 110 to HMU 88 when a predetermined current threshold has been exceeded.

Second system 122 also includes a meter 154 that is configured to sense the output from power source 110 and generate a visual indication to facilitate an operator determining when power source 110 is not operating within predefined limits. Second system 122 also includes a multi-position switch 156 to facilitate operating second system 122 in a plurality of different operational modes. In the exemplary embodiment, switch 156 is a three position switch such that second system 122 can be operated in three distinct modes of operation.

In the exemplary embodiment, portions of first system 120 and second system 122 are coupled within a container 170. For example, power source 110, current interrupters 132 and 152, resistive elements 130 and 150 are sealed substantially within container 170. Whereas, portions of switches 136 and 156, are meters 134 and 154 extend at least partially through container 170 to enable an operate to control driver simulator 100 from outside container 170. In the exemplary embodiment, container 170 is fabricated utilizing a substantially water proof and shock resistant material. Moreover, container 170 is fabricated utilizing a relatively light weight material such that driver simulator 100 is portable and can be utilized on a wide variety of gas turbine engines located in different locations.

Figure 4:
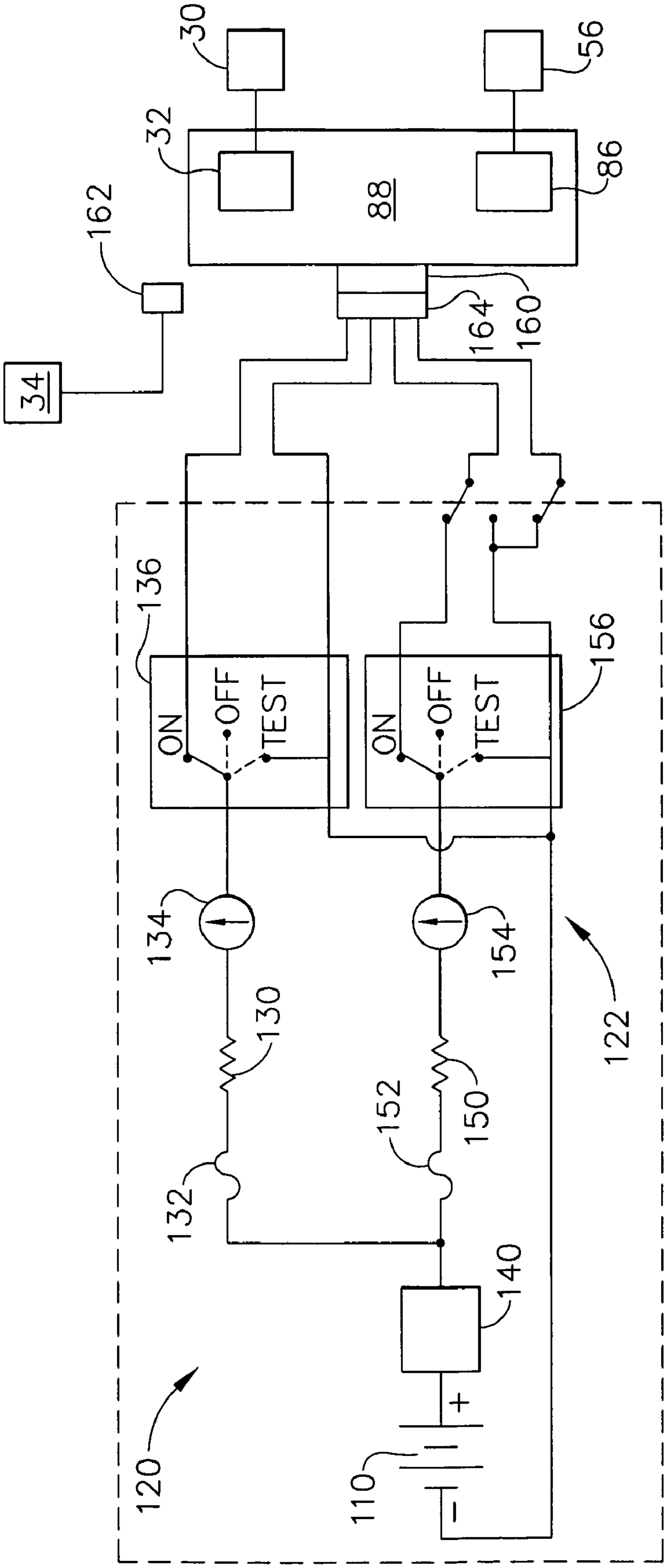
FIG. 4 is a simplified schematic illustration of the exemplary driver simulator coupled to the gas turbine engine shown in FIG. 1.

FIG. 4 is simplified schematic illustration of driver simulator 100 coupled to HMU 88. To operate driver simulator 100, driver simulator 100 is first coupled to HMU 88. More specifically, HMU 88 includes an electrical socket 160 and ECU 34 includes and electrical connector 162 that is configured to plug into socket 160 such that electrical and/or data signals can be transmitted from ECU 34 to HMU 88. Accordingly, to couple driver simulator 100 to HMU 88, electrical connector 162 is disconnected from electrical socket 160. Moreover, in the exemplary embodiment, although ECU 34 may include a plurality of electrical connectors that are coupled to HMU 88, electrical connector 162 represents the connector that is utilized to transmit information to HMU 88 that is utilized by HMU 88 to reposition at least one of the VSV's 56 and/or VBV 30.

In the exemplary embodiment, when gas turbine engine 10 is offline, i.e. gas turbine engine 10 is not operating, ECU 34 does not provide an electrical signal to HMU 88 to facilitate repositioning either VSV's 56 and/or VBV 30. For example, as described previously herein, when gas turbine engine 10 is stopped, or taken offline, ECU 34 ceases to transmit a control signal to HMU 88 to facilitate controlling either VSV's 56 and/or VBV 30. Accordingly, electrical connector 162 is uncoupled, or unplugged, from electrical socket 160 to facilitate providing an electrical access to couple driver simulator 100 to HMU 88. Therefore, and in the exemplary embodiment, driver simulator 100 is coupled to HMU 88 utilzing a connector 164 that is coupled to, or plugged into, socket 160.

After driver simulator 100 is electrically coupled to HMU 88, driver simulator 100 may be operated in a plurality of modes. More specifically, either switch 136 and/or switch 156 is repositionable such that driver simulator 100 is operable in either a first mode, a second mode, or a third mode to facilitate repositioning either VSV's 56 and/or VBV 30, respectively. In the first mode of operation, also referred to herein as the "ON" mode, at least one of switches 136 and/or 156 is positioned in a first position such that power source 110 is electrically coupled to HMU 88. For example, during operation, when the operator moves at least one of switches 136 and/or 156 to the "ON" position, at least one of VSV's 56 and/or VBV 30 is repositioned to a desired operating position. More specifically, while switches 136 and/or 156 are maintained in the "ON" position, electrical power is supplied from power source 110 to HMU 88 such that VSV's 56 and/or VBV 30 are repositionable. Additionally, while simulator 100 is maintained in the "ON" position, gas turbine engine 10 is rotated, either manually or automatically, to facilitate generating sufficient hydraulic pressure such that when either VSV's 56 actuator and/or VBV 30 actuator is activated utilizing driver simulator 100, hydraulic fluid is ported through the respective actuators to reposition either VSV's 56 and/or VBV 30. Alternatively, when switches 136 and/or 156 are moved from the "ON" position to another position, i.e. the second or third mode of operation, power supplied from power source 110 to HMU 88 is interrupted such that VSV's 56 and/or VBV 30 cease moving. More specifically, when power supplied from power source 110 to HMU 88 is interrupted driver simulator 100 provides no torque motor current so the torque motor current is approximately 0 mA. Thus VSV's 56 and/or VBV 30 slew towards the failsafe position as long as a hydraulic force is applied.

In the second mode of operation, also referred to herein as the "TEST" mode, at least one of switches 136 and/or 156 is positioned in a second position such that power source 110 is electrically coupled to a respective meter 134 and/or 154, to facilite determining the power discharging from power source 110. For example, during operation, when the operator moves at least one of switches 136 and/or 156 to the "TEST" position, a respective meter 134 or 154 displays the current supplied by power source 110 such that an operator can confirm that power source 110 is providing the predetermined current to reposition at least one of VSV's 56 and/or VBV 30. More specifically, operating driver simulator 100 in the "TEST" position enables an operator to confirm that power source 110 is providing a sufficient current to drive either servo motor 32 and/or servo motor 86 before driver simulator 100 is coupled to HMU 88.

In the third mode of operation, also referred to herein as the "OFF" mode, switches 136 and/or 156 are positioned in a third position such that power source 110 is electrically decoupled from HMU 88 to facilite either connecting and/or disconnecting driver simulator 100 from HMU 88. For example, during operation, when the operator moves switches 136 and/or 156 to the "OFF" position, meters 134 and 154 display approximately zero current such that an operator can safely either connect and/or disconnect driver simulator 100 from HMU 88.

The above-described driver simulator includes two systems that are each operable in a plurality of modes to facilitate repositioning at least one of VSV's 56 and/or VBV 30. More specifically, when the ECU is deactivated, the driver simulator functions to transmit a signal to at least one of the VSV's 56 and/or VBV 30. Accordingly, to borescope the gas turbine engine or perform other maintenance, the maintenance personnel can reposition the VSV's to a fully open position, and reposition the VBV to a fully closed position without disconnecting the fuel line between the fuel pump and the engine control system. Therefore, the driver simulator described herein facilitates eliminating the requirement to operate the gas turbine engine in a test configuration to verify that the fuel system is not leaking, therefore reducing the time and thus the cost of performing mainentance on the gas turbine engine.

Exemplary embodiments of a driver simulator are described above in detail. The driver simulator is not limited to the specific embodiments described herein, but rather, components of the system may be utilized independently and separately from other components described herein. Specifically, the driver simulator may be modified to be utilized on any known gas turbine engine.

While the invention has been described in terms of various specific embodiments, those skilled in the art will recognize that the invention can be practiced with modification within the spirit and scope of the claims.

What is claimed is:

1. A driver simulator for performing maintenance on a gas turbine engine assembly that includes an engine control unit and a gas turbine engine including at least one variable stator vane assembly, at least one variable bypass valve, a hydromechanical unit that is configured to be electrically coupled to the engine control unit and includes a first servo motor operatively coupled to the at least one variable stator vane assembly and a second servo motor operatively coupled to the at least one variable bypass valve, the engine control unit configured to transmit a control signal to the hydromechanical unit to facilitate operating at least one of the first servo motor and the second servo motor, said driver simulator comprising:

a first system configured to be electrically coupled to the hydromechanical unit and configured to reposition the variable stator vane assembly from a first operational position to a second operational position; and a second system configured to be electrically coupled to the hydromechanical unit and configured to reposition the variable bypass valve from a first operational position to a second operational position, said driver simulator configured to removably couple at least one of said first system and said second system to the hydromechanical unit to operate at least one of the first servo motor and the second servo motor when the engine control unit ceases to transmit the control signal to the hydromechanical unit.

2. A driver simulator in accordance with claim 1 wherein said first system comprises a first multi-position switch that is movable to reposition the variable stator vane assembly from the first operational position to the second operational position.

3. A driver simulator in accordance with claim 1 wherein said second system comprises a second multi-position switch that is movable to reposition the variable bypass valve from the first operational position to the second operational position.

4. A driver simulator in accordance with claim 1 further comprising a power source configured to supply power to said first and second systems.

5. A driver simulator in accordance with claim 4 wherein said power source comprises a direct current power source.

6. A driver simulator in accordance with claim 4 wherein said power source comprises a direct current battery.

7. A driver simulator in accordance with claim 6 further comprising a reverse polarity switch configured to reverse a polarity between said direct current battery and the hydromechanical unit.

8. A driver simulator in accordance with claim 2 wherein said first system comprises a power source and a first meter, said first multi-position switch movable to electrically couple said power source to said first meter to facilitate determining an electrical output of said power source.

9. A driver simulator in accordance with claim 3 wherein said second system comprises a power source and a second meter, said second multi-position switch movable to electrically couple said power source to said second meter to facilitate determining an electrical output of said power source.

10. A driver simulator in accordance with claim 2 wherein said first system further comprises a first current interrupting device that is configured to interrupt a flow of electrical current from a power source to the hydromechanical unit.

11. A driver simulator in accordance with claim 3 wherein said second system further comprises a second current interrupting device that is configured to interrupt a flow of electrical current from a power source to the hydromechanical unit.

12. A driver simulator in accordance with claim 2 wherein said first system further comprises a first resistive element to regulate a flow of electrical current from a power source to the hydromechanical unit.

13. A driver simulator in accordance with claim 3 wherein said second system further comprises a second resistive element to regulate a flow of electrical current from a power source to the hydromechanical unit.

14. A driver simulator in accordance with claim 2 wherein said first multi-position switch is a three-position switch.

15. A driver simulator in accordance with claim 3 wherein said second multi-position switch is a three-position switch.

* * * * *